(12) United States Patent
Orten

(10) Patent No.: US 7,878,012 B1
(45) Date of Patent: Feb. 1, 2011

(54) PORTABLE SPRINKLER SYSTEM

(76) Inventor: Philip A. Orten, 3453 Shell Pond La., Loris, SC (US) 29569

( * ) Notice: Subject to any disclaimer, the term of this patent is extended or adjusted under 35 U.S.C. 154(b) by 0 days.

(21) Appl. No.: 12/586,360

(22) Filed: Sep. 21, 2009

(51) Int. Cl.
*F25B 39/04* (2006.01)
*F28D 5/00* (2006.01)

(52) U.S. Cl. .......................... 62/183; 62/305

(58) Field of Classification Search .......... 62/183, 62/121, 304, 305, 171, 91, 526
See application file for complete search history.

(56) References Cited

U.S. PATENT DOCUMENTS

| | | | |
|---|---|---|---|
| 2,278,242 A | 3/1942 | Chapman | |
| 2,450,571 A | 10/1948 | Bahnson, Jr. | |
| 4,213,306 A | 7/1980 | Peabody et al. | |
| 4,266,406 A * | 5/1981 | Ellis | 62/183 |
| 5,285,651 A | 2/1994 | Marine | |
| 5,311,747 A | 5/1994 | Pringle et al. | |
| 5,497,633 A * | 3/1996 | Jones et al. | 62/314 |
| 5,643,082 A | 7/1997 | Furukawa | |
| 5,701,748 A * | 12/1997 | Phelps et al. | 62/91 |
| 6,105,376 A | 8/2000 | Stewart et al. | |
| 6,253,565 B1 | 7/2001 | Arledge | |
| 6,381,980 B1 | 5/2002 | Pringle | |
| 6,438,977 B1 | 8/2002 | McKay | |
| 6,658,872 B1 | 12/2003 | James | |
| 6,892,552 B2 * | 5/2005 | Richman et al. | 62/305 |
| 2004/0070091 A1 * | 4/2004 | Rotering et al. | 261/70 |

FOREIGN PATENT DOCUMENTS

WO    WO 8903553 A    *    4/1989

* cited by examiner

*Primary Examiner*—Chen-Wen Jiang
(74) *Attorney, Agent, or Firm*—P. Jeff Martin; The McGougan Law Firm, LLC

(57) ABSTRACT

A portable sprinkler system for a cooling system is disclosed, the portable sprinkler system includes a fluid source coupled to the sprinkler system, a plurality of spray nozzles fluidly connected by conduit, a solenoid connected in series, a protective cover enclosing the sprinkler system, and an electricity source providing electricity to the system. The sprinkler system may be incorporated into an air conditioner cooling system, the sprinkler system includes a portable sprinkler system coupled to the air conditioner cooling system, the portable sprinkler system having a water source coupled thereto, a plurality of spray nozzles fluidly connected by conduit, a chemical injector for inhibiting mineral build-up, a filter, and a solenoid connected in series. The air conditioner cooling system includes a disconnect unit electrically connected to a transformer. A plurality of shields are coupled to the housing of the air conditioner, the shields arranged to deflect air turbulence.

14 Claims, 3 Drawing Sheets

PORTABLE SPRINKLER SYSTEM

RELATED APPLICATIONS

There are no previously filed, nor currently any co-pending applications, anywhere in the world.

BACKGROUND OF THE INVENTION

1. Field of the Invention

This application discloses claims and embodiments generally related to a portable sprinkler system for a cooling system, and more particularly, a sprinkler system coupled to and removable from an air conditioner system for supplying a fluid mist to the coils of the air conditioner system.

2. Description of the Related Art

It is desirable enhance the efficiency of air conditioner or cooling systems. One particular way to increase the efficiency is to lower the heat generated by the system, thereby lowering the energy expended by the system. Thus, it is advantageous to have an apparatus or device having the elements and features disclosed herein.

Several products and inventions have been proposed in order to achieve these goals. The art discloses apparatuses or devices that cool the condenser coils by supplying a fluid mist to the coils. However, the art does not appear to disclose the combination of elements and features disclosed herein.

This application presents claims and embodiments that fulfill a need or needs not yet satisfied by the products and inventions previously or presently available. In particular, the claims and embodiments disclosed herein describe a portable sprinkler system optionally having a protective, the system and/or cover coupled to an air conditioner system. The system may also include protective shields for directing the distribution of the fluid stream onto the coils. This application provides an unanticipated and nonobvious combination of features distinguished from the products and inventions preexisting in the art. The applicant is unaware of any product, disclosure or reference that discloses the features of the claims and embodiments disclosed herein.

A search of the prior art did not disclose any patents that read directly on the claims of the instant invention; however, the following references were considered related.

U.S. Pat. No. 5,285,651, issued in the name of Marine;
U.S. Pat. No. 6,658,872 B1, issued in the name of James;
U.S. Pat. No. 6,892,552 B2, issued in the name of Richman et al.;
U.S. Pat. No. 2,278,242, issued in the name of Chapman;
U.S. Pat. No. 5,311,747, issued in the name of Pringle et al.;
U.S. Pat. No. 6,381,980 B1, issued in the name of Pringle;
U.S. Pat. No. 2,450,571, issued in the name of Bahnson;
U.S. Pat. No. 6,253,565 B1, issued in the name of Arledge;
U.S. Pat. No. 6,105,376, issued in the name of Stewart et al.;
U.S. Pat. No. 4,213,306, issued in the name of Peabody et al.;
U.S. Pat. No. 5,643,082, issued in the name of Furukawa; and
U.S. Pat. No. 6,438,977 B1, issued in the name of McKay.

This application presents claims and embodiments that fulfill a need or needs not yet satisfied by the products, inventions and methods previously or presently available. In particular, the claims and embodiments disclosed herein describe a portable sprinkler system for a cooling system comprising a fluid source coupled to the sprinkler system, a plurality of spray nozzles fluidly connected by conduit, a solenoid connected in series, a protective cover enclosing the sprinkler system, and an electricity source providing electricity to the system, the portable sprinkler system providing unanticipated and nonobvious combination of features distinguished from the products, inventions and methods preexisting in the art. The applicant is unaware of any product, method, disclosure or reference that discloses the features of the claims and embodiments disclosed herein.

SUMMARY OF THE INVENTION

In accordance with one embodiment, a portable sprinkler system for a cooling system comprises a fluid source coupled to the sprinkler system, a plurality of spray nozzles fluidly connected by conduit, a solenoid connected in series, a protective cover enclosing the sprinkler system, and an electricity source providing electricity to the system.

In accordance with this embodiment, the portable sprinkler system may include a chemical injector for treating the fluid.

In accordance with this embodiment, the portable sprinkler system may include a filter for treating the fluid.

In accordance with this embodiment, the portable sprinkler system may include a water tight plug between the electricity source and the solenoid.

In another embodiment, an air conditioner cooling system comprises a portable sprinkler system coupled to the air conditioner cooling system, the portable sprinkler system comprising a water source coupled to the sprinkler system, a plurality of spray nozzles fluidly connected by conduit, a chemical injector for inhibiting mineral build-up, a filter, and a solenoid connected in series. The air conditioner cooling system also includes a disconnect unit electrically connected to a transformer, the transformer electrically coupled to the solenoid, and a plurality of shields coupled to the housing of the air conditioner, the shields arranged to deflect air turbulence.

In accordance with this and other embodiments, the portable sprinkler system may be removably attachable to air conditioner housing.

In accordance with this and other embodiments, the portable sprinkler system further comprises a protective cover. The protective cover may comprise at least one supporting unit for holding at least the conduit. The protective may further comprise a water tight connection between the transformer and the protective cover.

In accordance with this and other embodiments, the shields protect the spray nozzles and the fluid distributed therefrom.

In accordance with this and other embodiments the transformer comprises a 120 v to 240 v double insulated transformer.

BRIEF DESCRIPTION. OF THE DRAWINGS

The advantages and features of the present invention will become better understood with reference to the following more detailed description and claims taken in conjunction with the accompanying drawings, in which like elements are identified with like symbols, and in which:

FIG. 1 is a plan view of the system disclosed herein;

FIG. 2 a perspective view of a protective cover incorporated into the system;

DESCRIPTION OF THE PREFERRED EMBODIMENT

Detailed Description of the Figures

Figure 1:
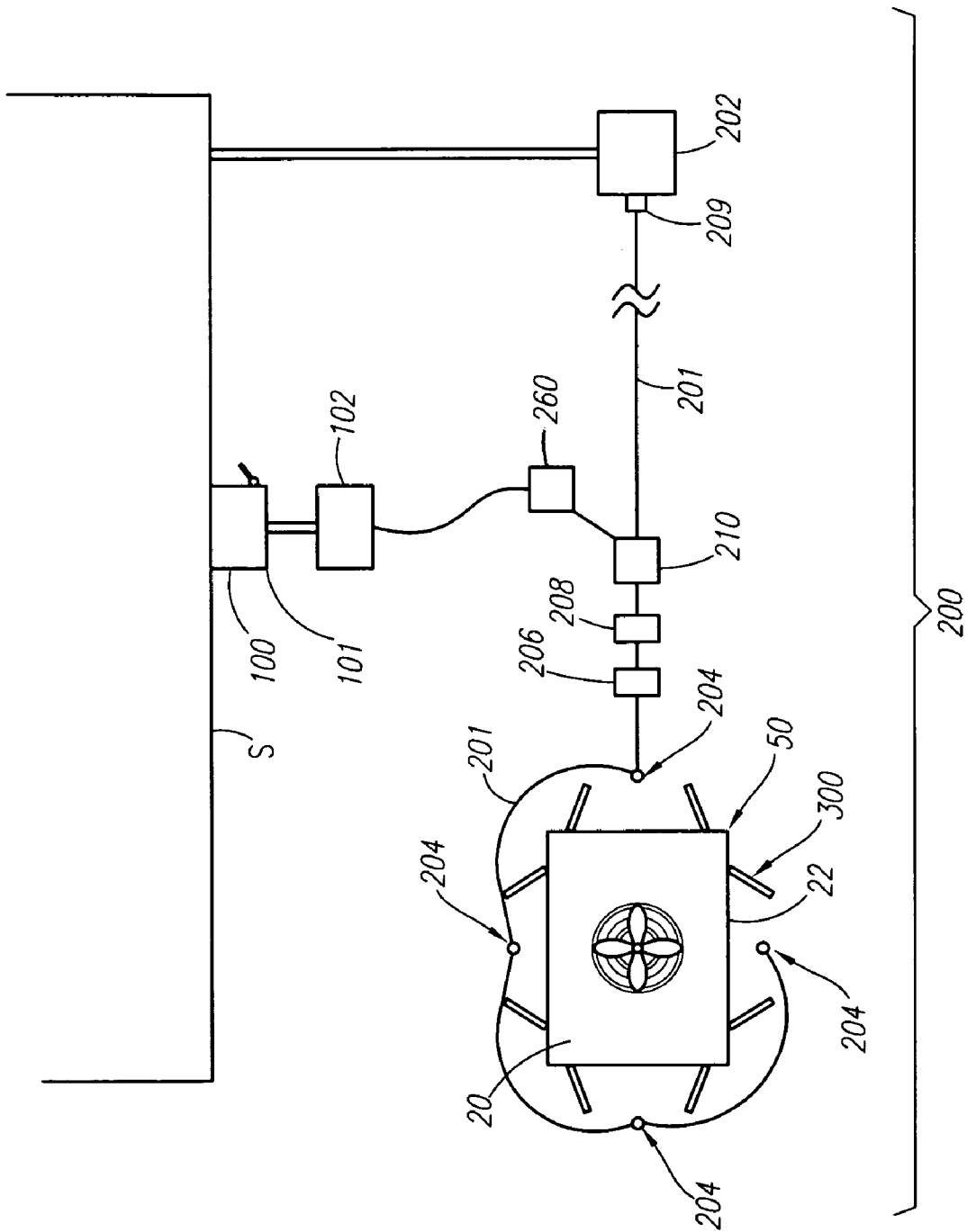
Figure 2:
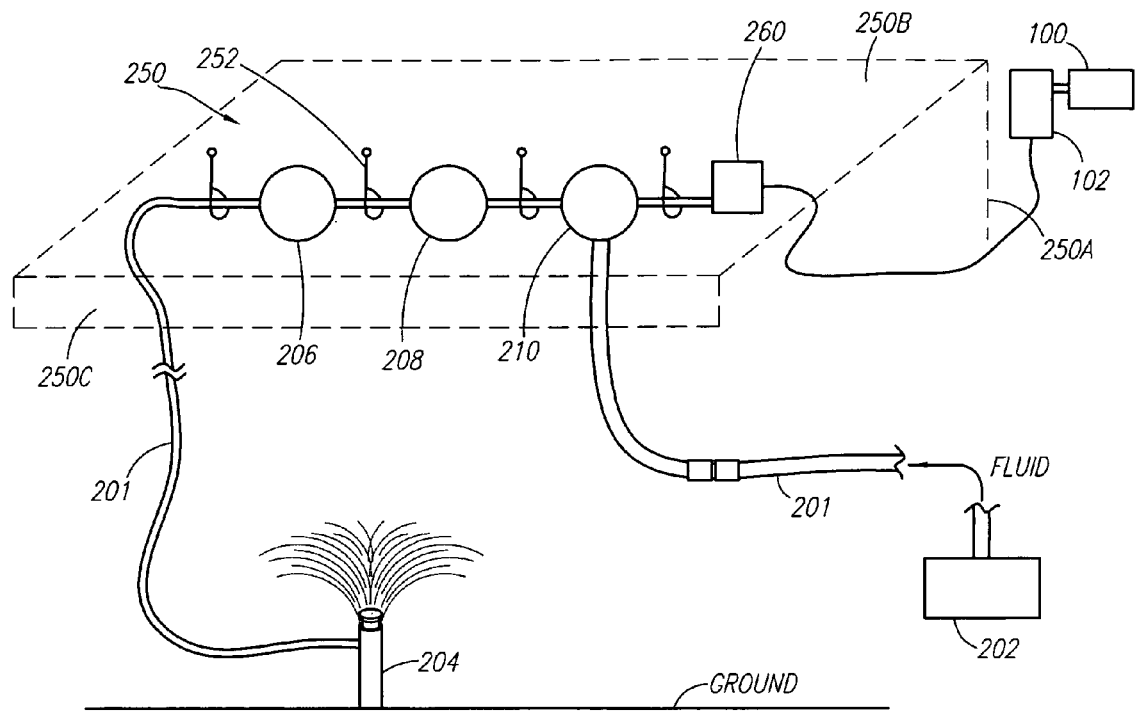
FIG. 2A is a perspective view of a shield, according to the preferred embodiment of the present invention.
FIG. 2B is a perspective view of a telescopically adjustable shield, according to one embodiment of the present invention.
Figure 2A:
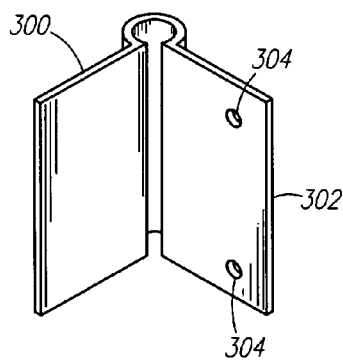
Figure 2B:
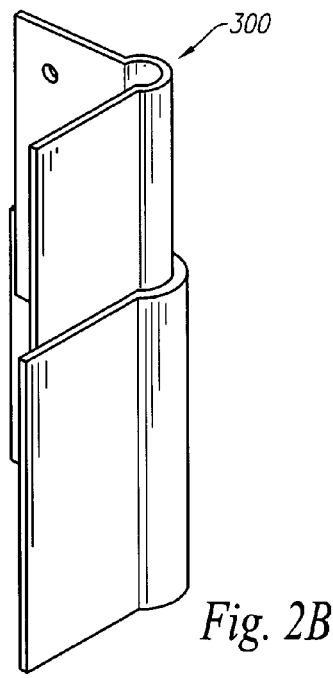
Figure 3:
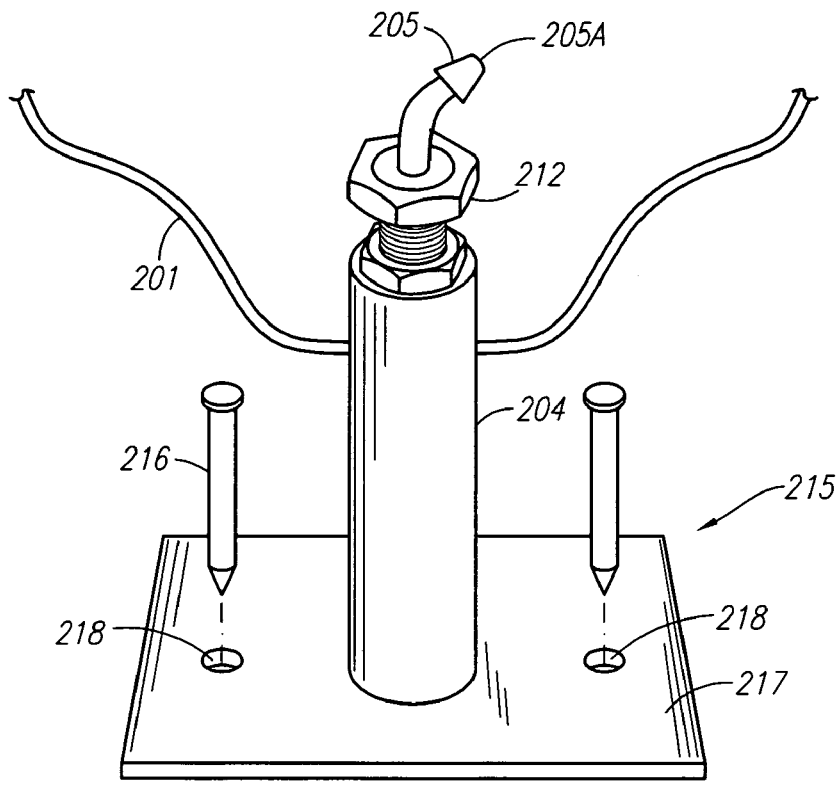
FIG. 3 is a perspective view of a nozzle illustrating the securing connector thereof, and a mechanical fastener, according to one embodiment of the present invention.
Figure 4:
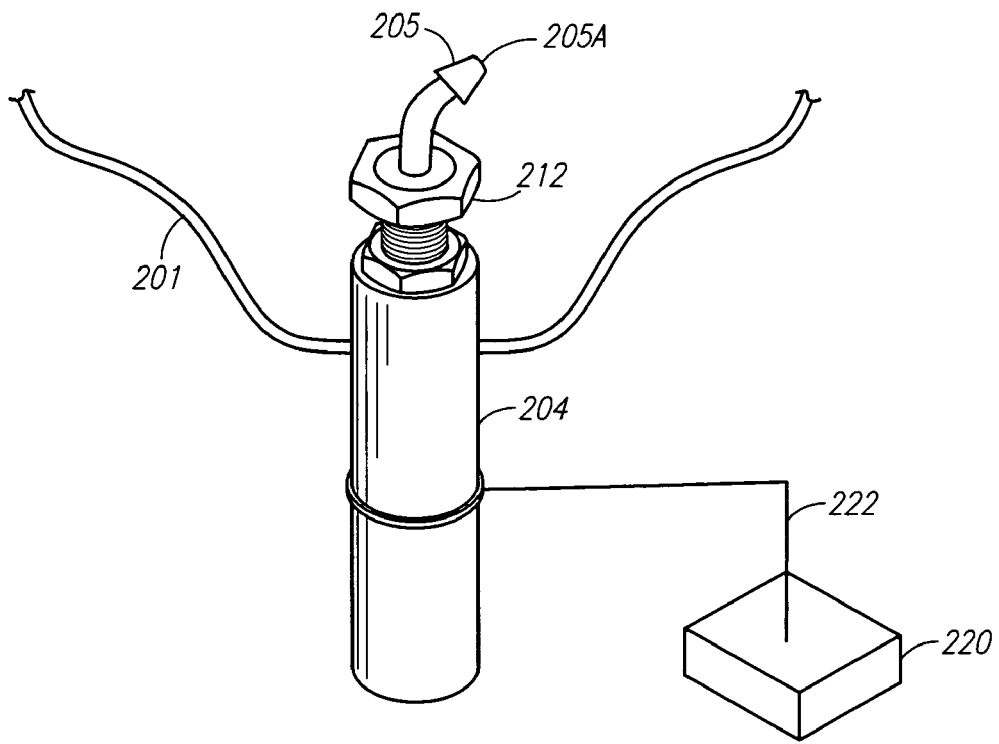
FIG. 4 is a perspective view of a mechanical fastener, according to an alternate embodiment of the present invention.

Referring now to FIG. 1 through FIG. 3, one embodiment disclosed describes an air conditioner system having a portable sprinkler system. A cabinet type of air conditioner unit 20 is depicted having a series of louvered side panels exteriorly protecting a condenser unit and a series of condenser coils. The condenser coils are arranged in a serpentine manner with the coils comprising a continuous flow path for conducting a fluid for cooling the unit 20, fluids usually labeled as refrigerants. Common refrigerants include the general chemical class of haloalkanes, and more particularly chlorofluorocarbons (CFCs) (e.g. Dupont refrigerant brand sold under the trademark FREON), hydrochlorofluorocarbons (HCFCs) and hydrofluorocarbons (HFCs). At least one fan blade is utilized to draw ambient air across the coils to aid in cooling the system and reducing the heat generated by the unit 20. As a means to further improve the cooling of the system and reduce heat build-up, a fluid mist is sprayed on or near the coils, usually in the form of water.

In accordance with this understanding, and referring now to the figures, an air conditioner cooling system 50 is disclosed generally comprising a disconnect unit 100 electrically connected to a transformer 102, and a portable sprinkler system 200 coupled to the air conditioner cooling system 50, and a plurality of shields 300 coupled to the housing of the air conditioner 20 for deflecting air turbulence from the nozzles 204 comprising part of the sprinkler system 200. The nozzles 204 each comprising a body 204a from which a nozzle head 205 extends therefrom and is in fluid communication therewith. The nozzles 204 each further comprising a nozzle head 205 having a nozzle opening 205a, the nozzle head 205 is maintained in a desired fixed directional position via a securing connector 212. The air conditioner cooling system 50 is adapted for residential or commercial use.

The disconnect unit 100 for the condenser unit is mounted to the outside of a structure S, such as a wall of a home or building. The disconnect unit 100 may include a protective box 101 enclosing the unit protecting the unit from exposure to environmental elements, including a variety of extreme weather conditions. The disconnect unit 100 and the transformer 102 are mutually coupled to one another via sealed electrical coupling. The transformer 102 is a 240 v to 120 v double insulated construction fused on the primary (PRI) winding of the transformer 102. As will be explained in greater detail below, the transformer 102 is electrically coupled to a solenoid 210 that comprises the portable sprinkler system 200 disclosed above.

The sprinkler system 200 may comprise a fluid source 202 coupled to the sprinkler system 200, providing water or other appropriate fluid distributed on or near the coils of the system 50. The sprinkler system 200 may also include a plurality of spray nozzles 204 fluidly coupled by conduit 201 to the fluid source 202. A conduit-to-fluid source adapter 209 fluidly connects fluid source 202 to conduit 201. Intermediately disposed between the fluid source 202 and the nozzles 204 may be a chemical injector 206 that may supply a solid or fluid chemical treatment for inhibiting mineral build-up within the conduit 201 and/or the nozzle heads 205 of the nozzles 204. Also intermediately disposed between the fluid source 202 and nozzles 204 may be a fluid filter 208 for cleaning contaminants from the fluid distributed from the fluid source 202. The sprinkler system 200 may also include a solenoid 210 connected in series for controlling the flow of fluid through the system 50. A ground fault circuit interrupter (GFI) 260 is connected between solenoid 210 and the transformer 102.

The sprinkler system 200 may also comprise a protective cover 250 that encloses the various components used in combination for a particularly configured system 50. The cover 250 comprises an upright wall 250a having an upper portion from which a roof 250b integrally extends perpendicularly therefrom. The roof 250b includes a forward edge from which an elongated skirt member 250c integrally extends perpendicularly therefrom. The cover 250 may comprise a variety of materials, including non-conductive metal, general plastic material, thermoplastic polymers such as polypropylene, polyethylene or polystyrene, or other similar and suitable materials. The cover 250 may include a plurality of support units 252 for securing and holding the conduit 201 and/or the various components of the sprinkler system 200. The support units 252 are envisioned to inhibit crimping or binding of the conduit 201, reducing the damage to the conduit 201, and extending the usable life of the conduit 201. In addition, organization of the conduit 201 and the interconnected components optimizes space allocation and permits the sprinkler system 200 to be compacted into a manageable and portable unit as provided.

The series or combination of nozzles 204 may be mounted in a variety of positions, including directly to the cabinet 22 of the air conditioner system 20, or mounted separately but adjacent to the system 20. For example, the series of nozzles 204 may be mounted in the ground or near the base of the system 50 for distributing the fluid upward and onto the coils within the cabinet 22. In such a configuration, the individual nozzles 204 of the series are interconnected by conduit 201, with a securing connector 212 utilized for maintaining the series in a water mist, discharge-directed, fixed position. As depicted, in but one envisioned embodiment, the series of nozzles 204 is arranged so that at least one single nozzle 204 is directed to one exposed side of the air conditioner system cabinet 22 (in some systems, this may include three exposed sides or four exposed sides, generally). Each individual nozzle 204 is secured directionally in place by a connector or mount 212 accommodating the nozzle opening 205a of the nozzle head 205, so as not to block the egress of the fluid, and further accommodating the use of a mechanical fastener 215 (e.g. threaded screw or bolt, stake 216, integral base 217, and/or other similar item) for securing the nozzle 204 in a stationary position. Base 217 comprises a plurality of apertures 218 each adapted to receive a stake 216 therethrough, and wherein stake 216 extends from a respective aperture 218 into the ground, and thereby firmly securing nozzle 204 to the ground. The connector or mount 212, and therefore the individual nozzle 204, is firmly secured to the ground or the ground surface (such as a concrete pad or other firm surface) by use of the mechanical fastener 215 disclosed above. Mechanical fastener 215, according to another embodiment, may be in the form of weighted block 220 encased in plastic. A lightweight bracket 222 mounted centrally atop weighted block 220 provides attachment means for removably attaching each nozzle 204 to a respective weighted block 220.

It is envisioned that each nozzle 204 is configured, either in a fixed or variable manner, to accommodate and deliver at least one-half gallon of fluid per hour. As noted above, a plurality of shields 300 may be installed and/or incorporated into the overall configuration. Each shield 300 may be mounted or arranged so as to optimize the deflection of air turbulence that is generated at or near the sprayer nozzles 204. It is envisioned that a plurality of shields 300 may be necessary for each sprayer nozzle 204 location to further optimize air turbulence deflection. The shields 300 inhibit the air flow from disturbing the distribution path of the fluid mist. The shields 300 may be of a variety of lengths, widths and composed of a variety of materials. For example, and in but one embodiment, the length of the shield 300 is envisioned to extend from the top to the base of the cabinet 22 to fully shield the sprayer nozzle 204 and fluid stream from air disturbance.

In accordance with an another embodiment, each shield 300 comprises a V-shape having an angular measurement of approximately 60°. The shield 300 includes a mounting plate 302 having a plurality of holes 304 defined therethrough, wherein holes 304 in mounting plate 302 are adapted to align with bolts provided on housing or condenser unit of air conditioner unit 20. According to yet another embodiment, each shield 300 may be telescopically adjustable so as to allow for various, selective longitudinal settings thereof.

If optionally provided, the injector 206 may be coupled with the conduit 201 line to provide a chemical solid or fluid material for treating the fluid. For example, in a water-based system, one or more chemical treatments may be used to inhibit the accumulation of minerals or other types of deposits. By treating the fluid, the conduit 201 lines and sprayer nozzles 204 may be maintained for longer periods of time, and may reduce the physical maintenance required on the line or sprayer nozzles 204.

Also, if optionally provided, the filter 208 may be coupled with the conduit 201 line as well to capture any contaminants or particulates that may reduce the shelf-life of the line and the sprayer nozzles 204. As important, the filter 208 may extract illness-causing contaminants from entering the air conditioner system. The filter 208 may be of a variety of forms, including charcoal, ultraviolet (UV), infrared (IR), magnetic, ionized or catalytic filters.

It is to be understood that the embodiments and claims are not limited in its application to the details of construction and arrangement of the components set forth in the description and illustrated in the drawings. Rather, the description and the drawings provide examples of the embodiments envisioned, but the claims are not limited to the specific embodiments. The embodiments and claims disclosed herein are further capable of other embodiments and of being practiced and carried out in various ways, including various combinations and subcombinations that may not have been explicitly disclosed. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. An air conditioner cooling system comprising:
- a portable sprinkler system coupled to an air conditioner cooling system, the portable sprinkler system comprising:
- a water source coupled to the sprinkler system;
- a plurality of spray nozzles fluidly connected by conduit;
- a chemical injector for inhibiting mineral build-up;
- a filter;
- a solenoid connected in series;
- a disconnect unit electrically connected to a transformer, the transformer electrically coupled to the solenoid;
- a ground fault circuit interrupter electrically connected between the solenoid and the transformer; and
- a plurality of shields coupled to the housing of the air conditioner, the shields arranged to deflect air turbulence.

2. The system of claim 1, wherein the portable sprinkler system is removably attachable to an air conditioner housing.

3. The system of claim 2, wherein the portable sprinkler system further comprises a protective cover.

4. The system of claim 3, wherein the protective cover comprises at least one supporting unit for holding at least the conduit.

5. The system of claim 4 further comprising a water tight connection between the transformer and the protective cover.

6. The system of claim 1, wherein the shields protect the spray nozzles and inhibit air flow from disturbing a distribution path of a fluid distributed therefrom.

7. The system of claim 1, wherein the transformer comprises a 120 v to 240 v double insulated transformer.

8. The system of claim 1, wherein the plurality of spray nozzles are firmly secured to the ground via a mechanical fastener.

9. The system of claim 8, wherein the mechanical fastener comprises a base formed integral to a lower end of each the plurality of spray nozzles, the base comprises a plurality of apertures each adapted to receive a stake therethrough and the stake extending therethrough and into the ground, thereby firmly securing each of the plurality of spray nozzles to the ground.

10. The system of claim 8, wherein the mechanical fastener comprises a weighted block encased in plastic.

11. The system of claim 10, wherein the weighted block comprises a lightweight bracket mounted centrally thereatop, the bracket defined as an attachment means for removably attaching each the plurality of spray nozzles to a respective weighted block.

12. The system of claim 1, wherein each the plurality of spray nozzles accommodate and deliver at least one-half gallon of fluid per hour.

13. The system of claim 1, wherein the shields each comprises a V-shape having an angular measurement of approximately 60°, the shields each includes a mounting plate having a plurality of holes defined therethrough, wherein the holes in the mounting plate align with bolts provided on housing of the air conditioner cooling system.

14. The system of claim 1, wherein the shields are telescopically adjustable so as to allow for various, selective longitudinal settings thereof.

* * * * *